(12) United States Patent
Stahl et al.

(10) Patent No.: US 7,392,523 B1
(45) Date of Patent: Jun. 24, 2008

(54) SYSTEMS AND METHODS FOR DISTRIBUTING OBJECTS

(75) Inventors: George Herbert Stahl, Santa Monica, CA (US); Malcolm Lockhart, Cary, NC (US)

(73) Assignee: Symantec Corporation, Cupertino, CA (US)

( * ) Notice: Subject to any disclaimer, the term of this patent is extended or adjusted under 35 U.S.C. 154(b) by 612 days.

(21) Appl. No.: 10/859,466

(22) Filed: Jun. 1, 2004

(51) Int. Cl.
*G06F 9/445* (2006.01)
*H04L 9/32* (2006.01)

(52) U.S. Cl. .................... 717/177; 705/58; 713/187; 726/27

(58) Field of Classification Search ............... None
See application file for complete search history.

(56) References Cited

U.S. PATENT DOCUMENTS

| | | | |
|---|---|---|---|
| 4,658,093 A | 4/1987 | Hellman | |
| 6,023,586 A * | 2/2000 | Gaisford et al. | 717/178 |
| 6,188,995 B1 * | 2/2001 | Garst et al. | 705/59 |
| 6,363,486 B1 * | 3/2002 | Knapton, III | 726/7 |
| 6,643,775 B1 | 11/2003 | Granger et al. | |
| 7,062,650 B2 * | 6/2006 | Robbins et al. | 713/167 |

* cited by examiner

*Primary Examiner*—Tuan Dam
*Assistant Examiner*—Michael Yigdall
(74) *Attorney, Agent, or Firm*—Finnegan, Henderson, Farabow, Garrett & Dunner LLP (57) ABSTRACT

Systems and methods consistent with the present invention ensure software integrity by associating each software component to be included in a federation with a distinct unique identifier. A subset of the identifiers corresponding to any two software components should match for the federation to be accepted.

25 Claims, 4 Drawing Sheets

SYSTEMS AND METHODS FOR DISTRIBUTING OBJECTS

BACKGROUND

1. Field of the Invention

The present invention relates to processes for distributing computer software and in particular, to measures to ensure software integrity and prevent software piracy during software distribution.

2. Background Information

Software can be distributed using a wide variety of techniques. For example, users may download software over the Internet or buy packaged software on mass-produced pre-recorded computer media at a retail store. The wide variety of distribution mechanisms for software coupled with the ease with which it can be copied, makes software extremely susceptible to piracy. Software developers incur substantial losses on account of the distribution and sale of unauthorized or illegal copies of software.

Modern software packages typically consist of several different components. A main executable program may call any one of a set of executable component programs at run-time that are targeted to perform specific tasks. Such component programs can form part of a library of programs that can be called by the main program. Some of these library component programs, also called Dynamic Linked Libraries (DLLs), may be shared between several different software packages, obviating the need to rewrite programs for specific, repeatedly used tasks that may be common to the group of software packages. DLLs are not executable by themselves but must be called by other programs. DLL files allow for more efficient use of computer random access memory (RAM) because they are only loaded into RAM when called.

To thwart software pirates and counterfeiters, DLLs are typically digitally signed by their creators. A digital signature is an encrypted electronic signature that can be used to authenticate a document and the identity of the document's creator. A digital signature can be used to ensure that the document originated with the entity signing it and that it was not tampered with after the signature was applied. When a DLL is called, its digital signature is first decrypted and authenticated by the calling program. If the authentication fails, the calling program may abort or return an error condition. If the authentication succeeds, the calling program can proceed to a subsequent stage.

Software companies generally use a wide variety of rights management models that range from perpetual licenses with no expiration date to trial or evaluation licenses that may expire within a relatively short period after activation. The existence of a valid license is generally determined whenever the software is started by a user. For example, a "licensing DLL" may be called following the start of a main program to determine whether a valid license is present. Upon authentication of the licensing DLL's digital signature, the main program may send a license validation request to the licensing DLL. If the license is determined to be invalid the main program can be aborted. If the DLL determines that a valid license exists, it can communicate the existence of a valid license to the main program before exiting. The main program may then continue with the remainder of its tasks.

The use of digital signatures with DLLs prevents tampering with the DLL and/or its substitution with a counterfeit pirate-created DLL. However, it does not prevent a software pirate, for example, from substituting a DLL created by a software company for a software package and using it with a different version of the same software package. For example, a pirate could take the entire licensing DLL for a product with a perpetual license, and use this DLL in a version of the same product that has a much shorter license period. The substituted licensing DLL will be authenticated correctly by calling programs because it was created by the software company, has not been altered in any manner and bears the correct digital signature. Thus, the substitution of the original DLL of a software package with a DLL taken from a different version, destroys the integrity of the software package and has the effect of defeating the licensing mechanism for the software package with the shorter licensing period. Moreover, such a substitution of DLLs would also allow software pirates to circumvent the rights management policies of the software company and sell unauthorized versions of products which could have a significant financial impact on the company in terms of lost sales and revenue.

Therefore, there is a need for systems to ensure the integrity of software components associated with a software package or software product family and to support the rights management models practiced by software companies.

SUMMARY

In accordance with implementations of the present invention, systems and methods for ensuring software integrity are presented.

In some methods for ensuring software integrity consistent with the present invention, a federation of software components is created by associating a distinct set of unique identifiers with each software component that is part of a software package. A subset of the identifiers associated with any two federated software components should match for the software package to operate.

These and other implementations are further explained below with respect to the following figures.

DETAILED DESCRIPTION

In accordance with the present invention, systems and methods are provided for ensuring software integrity. In some methods for ensuring software integrity consistent with the present invention, a federation of software components is created by associating a distinct set of unique identifiers with each component of a software package. Each identifier is unique to the software component with which the identifier is associated. Each identifier is composed of a set of values and any two identifiers associated with software components belonging to the federation will contain a common subset of values. The components along with their identifiers are then built into the federation. In some methods for ensuring software integrity, additional anti-tamper software may be added to the federation. The software package is then digitally signed and deployed.

In one implementation consistent with the present invention, checks to ensure software integrity may occur each time the software package is started or, at periodic intervals of time. In one implementation consistent with the present invention, checks to ensure software integrity may include a validation step, in which the digital signature of a federated software component is validated. If the digital signature is determined to be valid, the identifiers of the federated software component are compared with the identifiers corresponding to a core component of the software package. In one implementation consistent with the present invention, the digital signature validation and identifier comparison operations are repeated for each federated software component. If an appropriate subset of the identifiers in each federated software component matches the identifiers in the core component, the federation is accepted and the software may proceed to perform additional functions. In some methods for ensuring software integrity consistent with the present invention, if a digital signature of any component is determined to be invalid or, if there is a mismatch between the identifiers in a federated software component and the appropriate corresponding identifiers subset in the core component, the federation can be rejected and the software run can be aborted.

Figure 1:
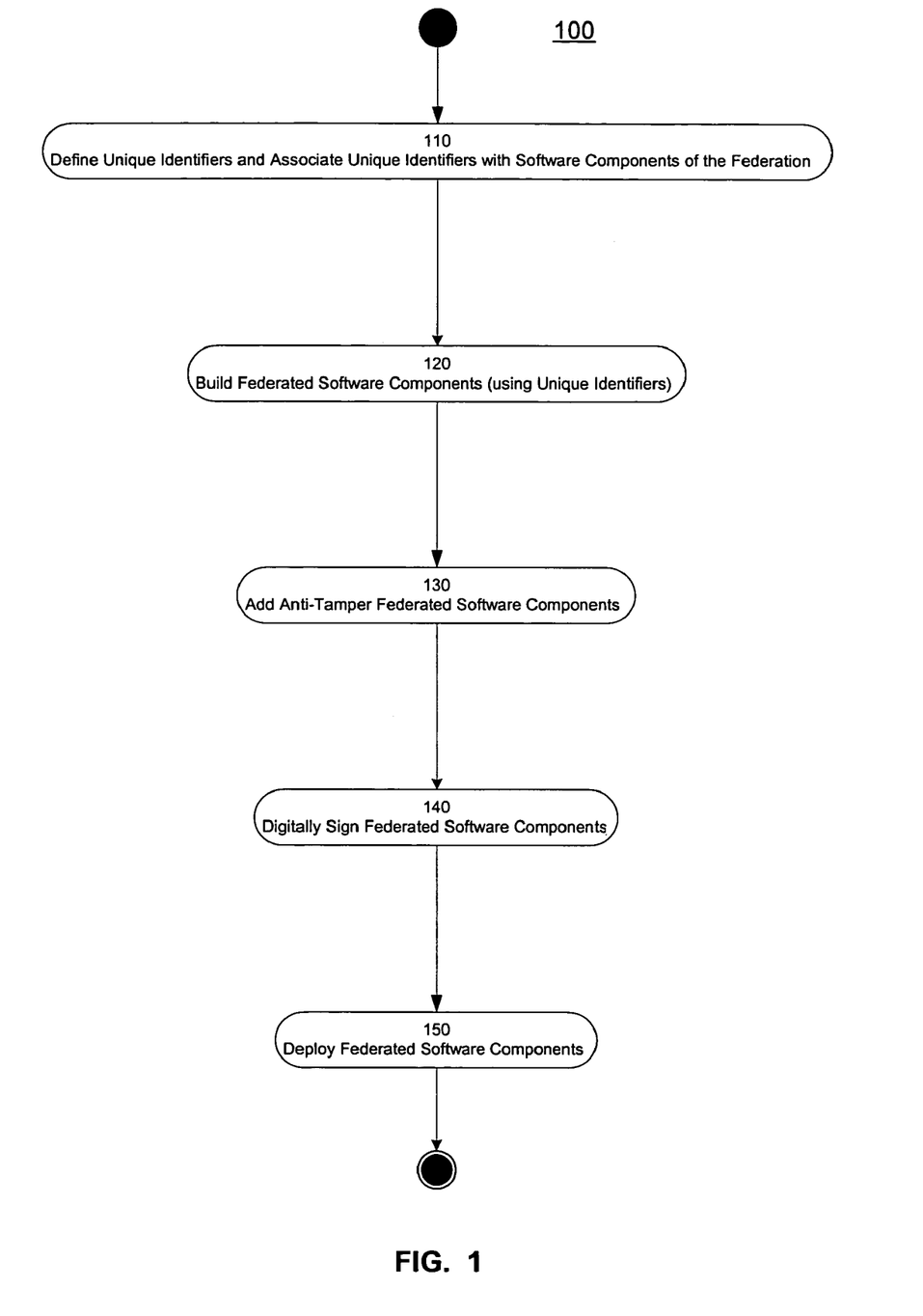
FIG. 1 illustrates steps in a system for creating a federation of software components according to one implementation of the present invention.

FIG. 1 depicts an exemplary method 100 for creating a federation of software components according to one implementation of the present invention. In step 110, identifiers are defined and associated with components of the federation. Identifiers associated with a federated software component are globally unique within the federation. Identifiers may include numbers, characters or strings, or a set of numbers, characters, and/or strings that uniquely identify a federated software component. In one implementation consistent with the present invention, an appropriate subset of the identifiers associated with each federated software component matches the identifiers of a core component, when the integrity of the federation is intact.

Consistent with one implementation of the present invention, in step 120, a software build process takes the components along with their associated identifiers to instantiate an integrated version of the federation. The process of integrating the various components, resources and other constituents needed to put together a software package is termed a software build. A software build can occur in a single stage or in multiple stages. In step 130, anti-tamper components may be added to the built federation. The anti-tamper components could include protection for the underlying code, from reverse engineering, from attempts aimed at changing the functionality of the underlying code or, from attacks aimed at exploiting specific vulnerabilities in the code. In one implementation consistent with the present invention, for example, commercially available anti-tamper software may be utilized.

In step 140, the federated software components are digitally signed. Digital signing of the federated software components allows their authenticity to be ascertained. Any changes or modifications to any components, after the signature has been applied, will prevent authentication of the components. In one implementation consistent with the present invention, for example, commercially available tools for creating digital signatures may be utilized.

Finally, in step 150, the software package including the digitally signed federated software components may be deployed for use. The software application configured in accordance with one implementation of the present invention may be deployed on a Windows operating system. In general, a computer software application configured in accordance with one implementation of the present invention can be designed for and deployed in any operating system.

Figure 2:
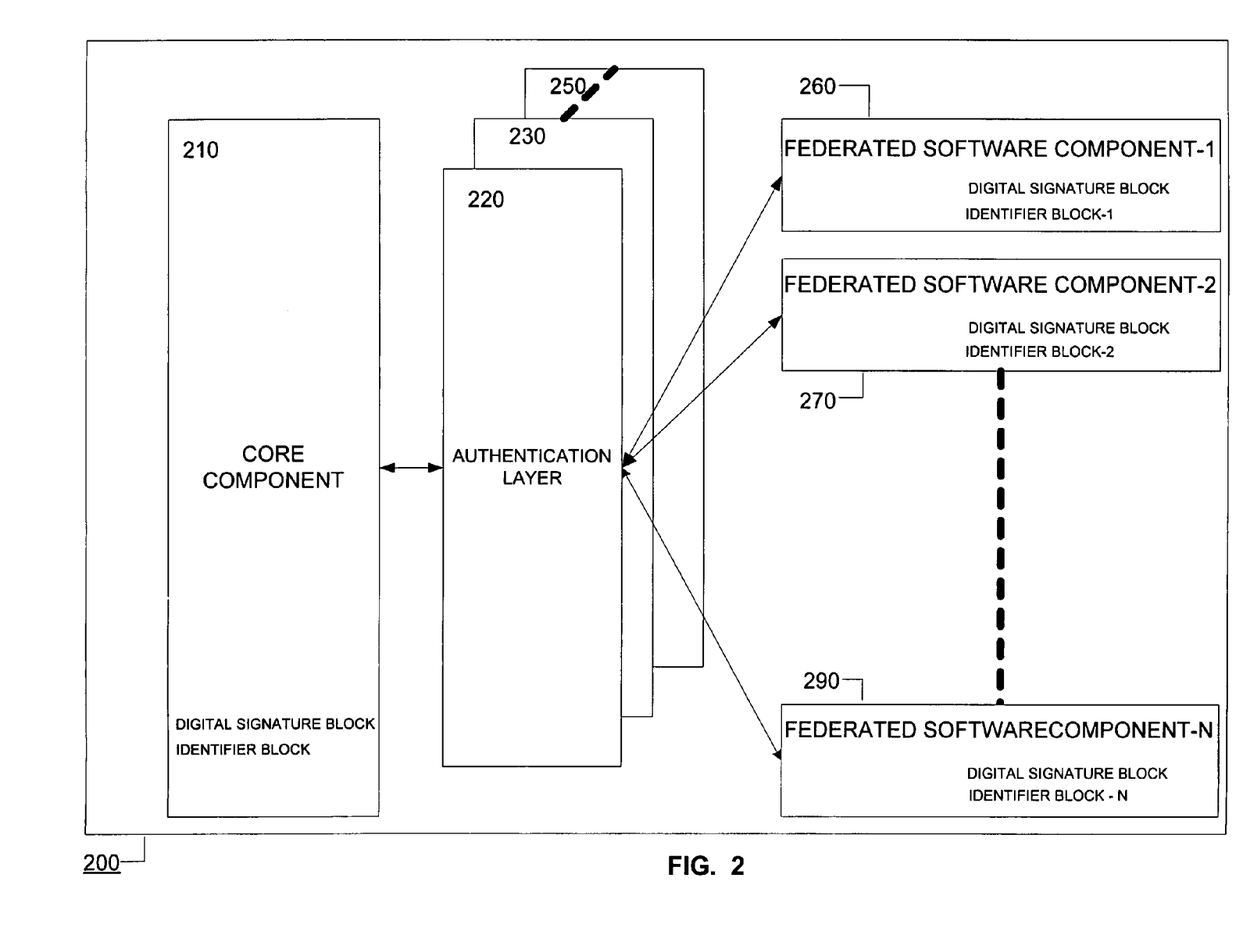
FIG. 2 shows an exemplary software architecture consistent with one implementation of the invention.

FIG. 2 depicts an exemplary software architecture 200 for a system of ensuring the integrity of software components according to one implementation of the present invention. As shown in FIG. 2, system 200 includes a core component 210, functional layers 220-250, including an authentication layer 220 and federated software components 260-290. The core component 210 may communicate with each of the functional layers 220-250. The functional layers can communicate with any of the federated software components 260-290, as needed. The number of functional layers may vary as required by the software application (indicated by the dotted line joining Functional Layer 230 to Functional Layer 250 in FIG. 2). The number of federated software components may also vary as required by the software application (indicated by the dotted line joining Federated Software Component-2 270 to Federated Software Component-N 290 in FIG. 2).

The Core Component 210 may contain a Digital Signature Block and an Identifier Block, as shown in FIG. 2. Each of the Federated Software Components 260-290 may also include a Digital Signature Block and an Identifier Block. The Identifier Block uniquely identifies each federated software component. Some subset of the Identifier Blocks associated with any two federated software components will match. An Identifier Block may be implemented as an array, a list, a set or any data structure that is suitable for holding and/or manipulating the data type being used for identifiers, according to one implementation of the present invention. If the Identifier Block included in the Core Component 210 matches an appropriate subset of the Identifier Block in each of the Federated Software Components 260-290, the components form part of a federation. In addition, for the federation to be successfully recognized, the Digital Signature Block in each component is validated. The authentication of the software components using their Digital Signature Blocks and the matching of the Identifier Blocks of the Federated Software Components 260-290 with the Core Component 210, can be performed by Authentication Layer 220.

There exist many well-known processes for creating and validating digital signatures. One example is the Digital Signature Algorithm, which may be used by a signatory to generate a digital signature on data and by a verifier to verify the authenticity of the signature. Each signatory has a public and private key. The private key is used in the signature generation process and the public key is used in the signature verification process.

To generate the correct digital signature for a signatory, knowledge of the private key of the signatory is needed. In other words, signatures cannot be forged, without knowledge of a signatory's private key. However, by using the signatory's public key, anyone can verify a correctly signed message.

The Digital Signature Algorithm uses parameters denoted by p, q, g, and x, which are defined below:

p is an L-bit prime p, where $512 \geqq L \leqq 1024$, and L is divisible by 64;

q is a 160-bit prime q, such that q is a factor of p−1, i.e. (p−1)=qz, where z is any natural number;

h is chosen such that, $1 < h < p-1$ and $g = h^z \bmod p > 1$;

x is chosen randomly such that $0 < x < q$ and $y = g^x \bmod p$. The Public Key is y and the Private Key is x.

To generate a digital signature, the algorithm also makes use of a one-way hash function, SHA(m), such as, for example, the Secure Hash Algorithm, and a randomly generated number k, where 0<k<q. Parameter k is regenerated for each time a signature is generated. Parameters x and k are used for signature generation and are kept secret.

The Digital Signature (r, s) of a message M is the pair of numbers r and s computed according to the equations below:

$$r=(g^k \bmod p) \bmod q \text{ and}$$

$$s=(k^{-1} \text{SHA}(M)+xr)) \bmod q.$$

Prior to verifying the signature in a signed message, p, q, g and the sender's public key y and identity are made available to verifiers. These parameters may publicly distributed. Additionally, the Digital Signature (r, s) is also made available along with its associated message M to potential verifiers.

To verify the signature, the verifier first checks to see that 0<r<q and 0<s<q; if either condition is violated the signature is invalid.

If these two conditions are satisfied, the verifier computes:

$$w=s^{-1} \bmod q;$$

$$u_1=((\text{SHA}(M))^*w) \bmod q;$$

$$u_2=(rw) \bmod q; \text{ and}$$

$$v=((g^{u1}*y^{u2}) \bmod p) \bmod q.$$

If v=r, then the signature is verified. On the other hand, if v≠r, then the message may have been modified and the signature should be considered invalid.

As shown in FIG. 2, authentication layer 220 communicates with Core Component 210 and each of the Federated Software Components 260-290 and performs functions to ensure the integrity of the software package consistent with embodiments of the present invention.

Figure 3:
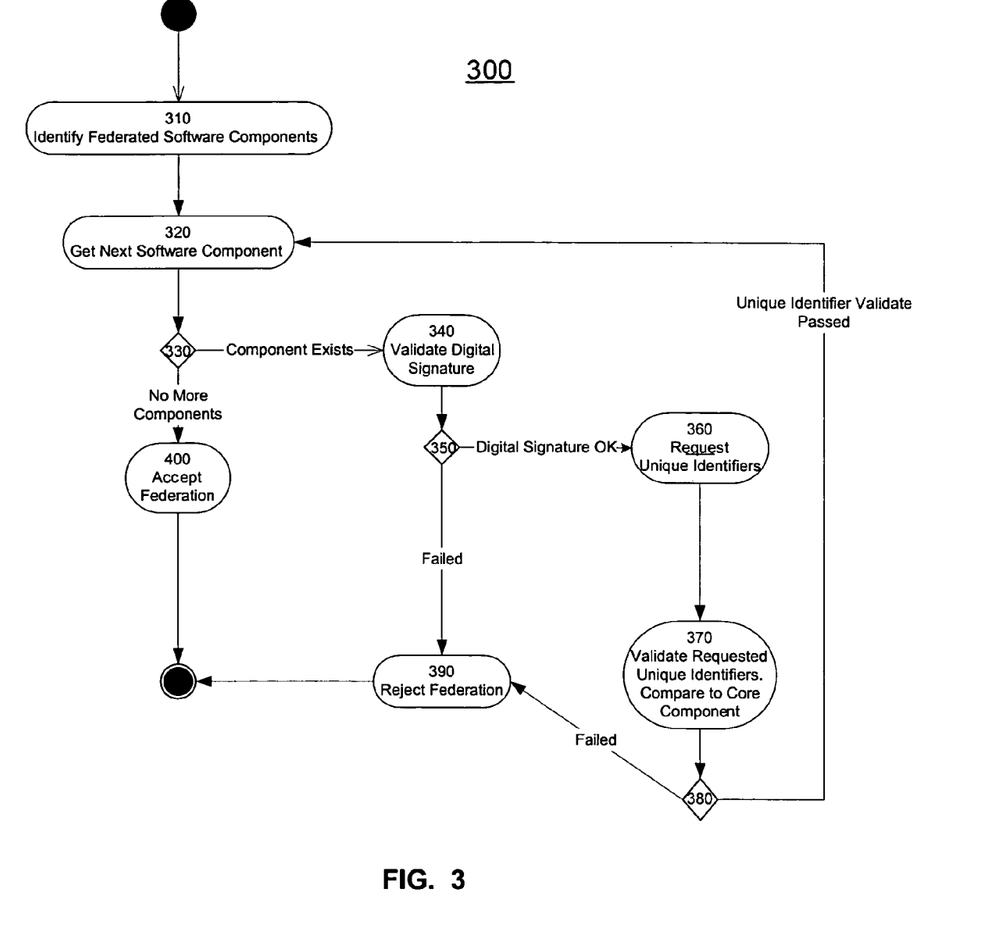
FIG. 3 shows a flowchart of an exemplary method for ensuring software integrity according to one implementation of the present invention.

FIG. 3 illustrates a flowchart 300 of an exemplary method of ensuring software integrity according to one implementation of the present invention. In step 310, federated software components that are part of the software federation are identified. In one implementation consistent with the present invention, these federated software components could be the federated software components 260-290 shown in FIG. 2.

In step 320, a federated software component identified in step 310 and heretofore unselected, is selected for processing. A decision is made based on the existence of such a component, in step 330. If such a component exists, its digital signature is validated in step 340.

In step 350, a decision is then made based on the result of the digital signature validation process conducted in step 340. If the signature has been determined to be invalid in step 340, the federation is rejected in step 390. If the digital signature has been determined to be valid in step 340, identifiers are then requested from the federated software component in step 360.

Next, in step 370, the identifiers of the federated software component are compared with the identifiers of the core component. In one implementation, consistent with the present invention, the core component could be the core component 210 of FIG. 2. In step 380, a decision is then made based on the result of the identifier validation process conducted in step 370. If the identifiers of the federated software component are valid, the federated software component's membership in the federation is established and the process returns to step 320, where the next identified and unprocessed federated software component can be selected for membership validation. If no additional federated software components exist, then the federation is accepted in step 400. In one implementation consistent with the present invention, the identifier of a federated software component is determined to be valid if an appropriate subset of the identifiers in the federated software component matches the identifier of the core component. If the identifier validation process of step 370 indicates a mismatch, the federation is rejected in step 390.

In one implementation, the authentication layer 210, as shown in FIG. 2, can execute steps in the flowchart of FIG. 3. Further, methods consistent with the present invention may conveniently be implemented using program modules. Such modules, when executed, may perform the steps and features disclosed herein, including those disclosed with reference to the exemplary flow chart as shown in FIG. 3. The operations, stages, and procedures described above and illustrated in the accompanying drawings are sufficiently disclosed to permit one of ordinary skill in the art to practice the invention. Moreover, there are many computers and operating systems that may be used in practicing implementations of the instant invention and, therefore, no detailed computer program could be provided that would be applicable to these many different systems. Each user of a particular computer will be aware of the language, hardware, and tools that which are most useful for that user's needs and purposes.

In one implementation, modules of a program implementing a method to ensure software integrity may be stored in a computer-readable medium, such as a disk or memory stick, and executed when the computer-readable medium and stored program instructions are read by an computing device. As illustrated in FIG. 2, an authentication layer 210 may execute the method, illustrated by the flowchart of FIG. 3, of ensuring software integrity. The authentication layer may be implemented as a separate executable program, or may be provided as components or routines of an integrated program, in a manner consistent with the objects of the invention.

An example of an algorithm for a method to ensure software integrity is given by the following segment:

identify federated software components;
add federated software components to federated_component_list;
if (federated_component_list is not empty) {
current_component = next element of federated_component_list;
authenticate_federated_component(current_component);
} else { /*no components remain to be processed*/
accept federation;
}

In the segment above, a federated software component is chosen and the authenticate_federated_component module is repeatedly executed while there are unprocessed federated software components remaining in the federated software component list.

According to one implementation of the present invention, an example of an algorithm to perform the authenticate_federated_component module is given by the following segment:

authenticate_federated_component module
get digital signature of current_component;
validate digital signature of current_component;
if (digital signature of current_component is invalid)
reject federation;
stop;
} else { /*digital signature is valid*/
validate_identifier(current_component);
if (identifier of current_component is invalid) {
reject federation;
stop;
} else {
remove current_component from federated_component_list;

```
    return;
  }
}
```
The authenticate_federated_component module determines whether the digital signature of the federated software component currently being processed is valid. If the digital signature is valid, the validate_identifier module is invoked to validate the identifiers of the component. If the digital signature of the federated software component currently being processed is determined to be invalid, the federation is rejected.

An example of an algorithm to perform the validate_identifier module used above is given by the following segment:

```
validate_identifier module
  get identifiers of current_component;
  get identifiers of core_component;
  identifier_F = identifiers of current_component;
  identifier_C = identifiers of core_component;
  if identifier_C present in identifier_F {
    return(valid);
  } else {
    return(invalid);
  }
```

The validate_identifier module gets the identifiers associated with the current component and compares an appropriate subset of the current component's identifiers with the identifiers of the core component. If the comparison fails to find a match the identifier is invalid. If a match is detected, the identifier is valid. A flag may set to indicate the outcome of the comparison operation to the authenticate_federated_component module.

If all digital signatures and identifiers are valid and there are no more unprocessed components then the federation is accepted. If any identifier is invalid the federation is rejected.

Figure 4:
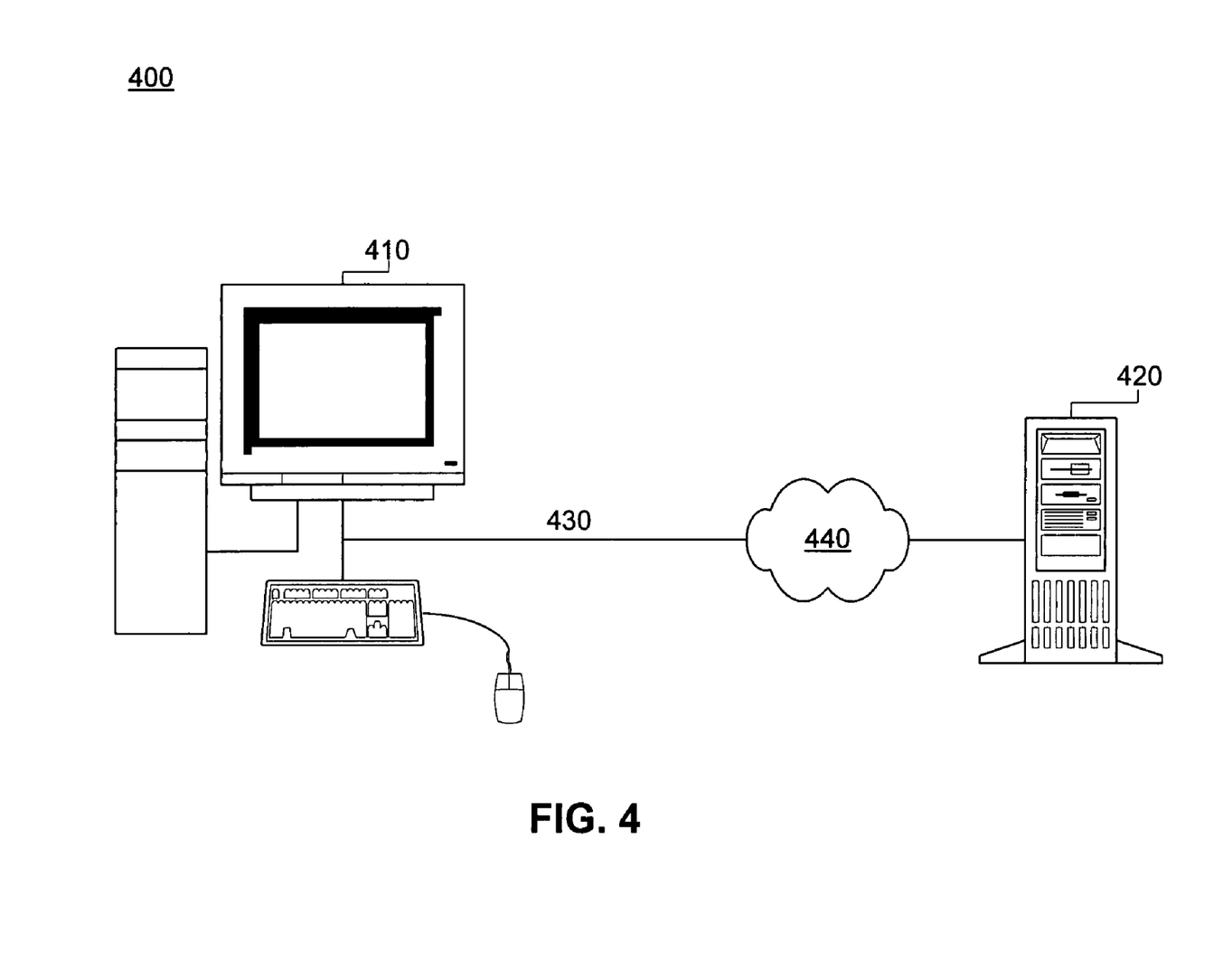
FIG. 4 shows a block diagram of a computing system in which methods for ensuring software integrity consistent with one implementation of the invention may be implemented.

FIG. 4 illustrates an exemplary computing system 400 capable of performing methods of ensuring software integrity according to implementations consistent with the present invention. A computer software application consistent with the present invention may be deployed on a network of computers, as shown in FIG. 4, that are connected through communication links that allow information to be exchanged using conventional communication protocols and/or data port interfaces.

As shown in FIG. 4, system 400 includes a computing device 410 and a server 420. Further, computing device 410 and server 420 may communicate over a connection 430, which may pass through network 440. Computing device 410 may be a computer workstation, desktop computer, laptop computer or any other computing device capable of being used in a networked environment. Server 420 may be a platform capable of connecting to computing device 410.

Connection 430 couples computing device 410 and server 420. Connection 430 may be implemented as a wired or wireless connection using conventional communication protocols and/or data port interfaces. In general, connection 430 can be any communication channel that allows transmission of data between computing device 410 and server 420, including network channels and transfer of data between machines on fixed storage media. In one implementation, for example, both computing device 410 and server 420 may be provided with conventional data ports, for transmission of data through the appropriate connection 430. Network 440 could include a Local Area Network (LAN), a Wide Area Network (WAN) or the Internet. The communication links could be wireless links or wired links or any combination consistent with embodiments of the present invention, that allows communication between computing device 410 and server 420.

Computing device 410 can execute software that may be downloaded directly from server 420. Downloaded software may need to be installed and activated before it can be run on computing device 410. Activation of downloaded software may require a license key, provided by the vendor of the software, which may be generated by server 420 or by any other server (not shown) that is connected to the network. The license key is a code sequence that is generated by a license server. The license key may be an encoding of the attributes of the software and of some physical attributes of the network or of particular machines on the network. A license key is often part of a software vendor's mechanism to manage and enforce some of the terms in the license grant. Software downloaded to computing device 410 cannot be activated until the license key has been applied.

In one implementation consistent with the present invention, an authentication layer, such as the authentication layer 210 of FIG. 2, may execute steps in the flowchart of FIG. 3 to verify the integrity of software downloaded by computing device 410, before a license key is generated to activate the downloaded software. If the integrity of the software has been compromised, the server will not generate a license key and the software cannot be activated.

Although implementations of the present invention are described as being associated with software programs, one skilled in the art will appreciate that the methods described are applicable to the distribution of a variety of objects, where it is desired to maintain the integrity of the distribution and/or prevent unauthorized use of the individual units or components of the distribution outside of the context of their associated federation. For example, a federation could be composed of the chapters in a book, scenes or takes in a motion picture, compilations of songs, or other objects that may be recorded or stored in electronically readable media and/or distributed electronically. The integrity of the federation comprised of the components described above may be verified prior to enabling functionality associated with the object, such as by allowing a motion picture or audio recording to be played only if its component units form a valid federation.

The above-noted features and aspects of the present invention may be implemented in various environments. Such environments and related applications may be specially constructed for performing the various processes and operations of the invention, or they may include a general-purpose computer or computing platform selectively activated or reconfigured by program code to provide the functionality. The processes disclosed herein are not inherently related to any particular computer or other apparatus, and aspects of these processes may be implemented by any suitable combination of hardware, software, and/or firmware. For example, various general-purpose machines may be used with programs written in accordance with teachings of the invention, or it may be more convenient to construct a specialized apparatus or system to perform the required methods and techniques.

Implementations of the present invention also relate to computer-readable media that include program instructions or program code for performing various computer-implemented operations based on the methods and processes of embodiments of the invention. The program instructions may be those specially designed and constructed for the purposes of the invention, or they may be of the kind well known and available to those having skill in the computer software arts. Examples of program instructions include, for example, machine code, such as produced by a compiler, and files containing a high-level code that can be executed by the computer using an interpreter.

Other implementations of the invention will be apparent to those skilled in the art from consideration of the specification and practice of the implementations of the invention disclosed herein. It is intended that the specification and examples be considered as exemplary only, with a true scope and spirit of the invention being indicated by the following claims. As such, the invention is limited only by the following claims.

The invention claimed is:

1. A method comprising:
   creating a federation of objects by associating a unique identifier with each object to be included in the federation of objects;
   selecting a subset of the unique identifier of a first object for comparison with the unique identifier of a second object;
   comparing the selected subset of the unique identifier associated with the first object with the unique identifier of the second object;
   enabling functionality associated with the federation, if the selected subset of the unique identifier associated with the first object matches the unique identifier of the second object; and
   rejecting the federation of objects otherwise.

2. A method comprising:
   creating a federation of software components by,
      associating a unique identifier with each software component to be included in the federation of software components, and
      digitally signing each software component to be included in the federation of software components; and
   validating each software component in the federation of software components, wherein validating comprises
      selecting a subset of the unique identifier of a first software component for comparison with the unique identifier of a second software component;
      comparing the selected subset of the unique identifier associated with a first software component with the unique identifier of the second software component;
      continuing software execution, if the selected subset of the unique identifier associated with the first software component matches the unique identifier of the second software component; and
      rejecting the federation of software components otherwise.

3. The method of claim 2, wherein, the second software component is a core component of the federation of software components.

4. The method of claim 2, wherein, the second software component is any other software component of the federation of software components.

5. The method of claim 2, wherein associating a unique identifier with each software component further includes encrypting the unique identifier.

6. The method of claim 2, wherein selecting a subset of the unique identifiers of the first software component for comparison with the unique identifier of a second component further includes decrypting the unique identifiers of the first software component and the second software component.

7. The method of claim 2, where the associating a unique identifier with each software component is done at the time the federation of software components is built.

8. The method of claim 2 where the digital signing of each software component is done at the time the federation of software components is built.

9. The method of claim 2, where the validating of each software component occurs when a software package, which includes the federation of software components, is run.

10. The method of claim 2, where the validating of each software component occurs each time a software package, which includes the federation of software components, is first started.

11. The method of claim 2, where the validating of each software component occurs each time a component interacts with another component.

12. The method of claim 2, wherein the validating of each software component occurs each time a license to a software package, which includes the federation of software components, is verified.

13. The method of claim 2, wherein the validating of each software component occurs at specified intervals during the running of a software package that includes the federation of software components.

14. A method of ensuring the integrity of a federation of software components comprising:
   verifying a digital signature associated with a first software component;
   validating a unique identifier associated with the first software component, if the digital signature is authentic, wherein validating comprises,
      selecting a subset of the unique identifier of the first software component for comparison with a unique identifier of a second software component;
      comparing the selected subset of the unique identifier associated with the first software component with the unique identifier of the second software component; and
   accepting the federation if the selected subset of the unique identifier associated with the first software component matches the unique identifier of the second software component; and
   rejecting the federation otherwise.

15. The method of claim 14, wherein verifying the digital signature associated with the first software component further comprises:
   retrieving a digital signature associated with the first software component; and
   determining if the digital signature associated with the first software component is authentic.

16. The method of claim 14, wherein rejecting the federation further comprises aborting execution of the software federation.

17. The method of claim 14, wherein accepting the federation further comprises continuing execution of the software federation.

18. The method of claim 14, wherein the second component is a core component of the software federation.

19. The method of claim 14, wherein the method is performed by an authentication layer.

20. A computer-readable medium that stores instructions, which when executed by a computer perform steps in a method for ensuring the integrity of software, the steps comprising:
   validating predefined unique identifiers associated with software components, wherein validating comprises,
      selecting a subset of the unique identifier of a first software component for comparison with the unique identifier of a second software component;
      comparing the selected subset of the unique identifier associated with the first software component with the unique identifier of the second software component; and
   continuing with execution of the software, if the selected subset of the unique identifier associated with the first software component matches the unique identifier of the second software component; and performing an error routine otherwise.

21. A method of distributing at least one license key for a software federation associated with a digital signature the method comprising:

retrieving a unique identifier associated with a first software component, if the digital signature is authentic;

selecting a subset of the unique identifier of the first software component for comparison with a unique identifier of a second software component;

comparing the selected subset of the unique identifier associated with the first software component with the unique identifier of the second software component; and distributing the license key, if the selected subset of the unique identifier associated with the first software component matches the unique identifier of the second software component; and aborting the distribution of the license key otherwise.

22. The method of claim 21 wherein the distributing of license keys occurs over a network.

23. A computer readable memory containing instructions for controlling a computer system to perform steps in a method for ensuring software integrity, the steps comprising:

retrieving a unique identifier associated with a first software component;

selecting a subset of the identifier of the first software component for comparison with a unique identifier of a second software component;

comparing the selected subset of the unique identifier associated with the first software component with the unique identifier of the second software component;

allowing software execution to proceed, if the selected subset of the unique identifier associated with the first software component matches the unique identifier of the second software component; and performing an error routine otherwise.

24. A computer processor executing instructions that perform steps in a method for ensuring software integrity, the steps comprising:

retrieving a unique identifier associated with a first software component;

selecting a subset of the identifier of the first software component for comparison with a unique identifier of a second software component;

comparing the selected subset of the unique identifier associated with the first software component with the unique identifier of the second software component;

allowing software execution to proceed, if the selected subset of the unique identifier associated with the first software component matches the unique identifier of the second software component; and performing an error routine otherwise.

25. A computing system comprising:

means for retrieving a unique identifier associated with a first software component;

means for selecting a subset of the identifier of the first software component for comparison with a unique identifier of a second software component;

means for comparing the selected subset of the unique identifier associated with the first software component with the unique identifier of the second software component;

means for continuing software execution, if the selected subset of the unique identifier associated with the first software component matches the unique identifier of the second software component; and means for aborting software execution otherwise.

* * * * *